(12) United States Patent
Berndt (10) Patent No.: US 6,919,045 B1
(45) Date of Patent: Jul. 19, 2005

(54) SUPPLY ELEMENT FOR A LABORATORY MICROCHIP

(75) Inventor: Manfred Berndt, Karlsbad (DE)

(73) Assignee: Agilent Technologies, Inc., Palo Alto, CA (US)

( * ) Notice: Subject to any disclaimer, the term of this patent is extended or adjusted under 35 U.S.C. 154(b) by 16 days.

(21) Appl. No.: 09/598,890

(22) Filed: Jun. 22, 2000

(30) Foreign Application Priority Data

Jun. 22, 1999 (DE) .......................................... 199 28 412

(51) Int. Cl.[7] .............................. B01L 3/02; G01N 1/10; G01N 21/00; C02F 1/40; B01D 57/02

(52) U.S. Cl. ........................... 422/100; 422/58; 422/59; 422/102; 436/180; 436/174; 204/600; 204/601; 204/604; 204/450; 204/451; 204/453

(58) Field of Search ................................ 436/180, 174, 436/52, 172; 422/99, 100, 58, 59, 102, 68.1, 81, 82.01, 82.05, 82.08, 82.09; 204/600, 601, 450, 451, 453, 602, 604

(56) References Cited

U.S. PATENT DOCUMENTS

| | | | | |
|---|---|---|---|---|
| 3,915,652 A | * | 10/1975 | Natelson | ..................... 141/130 |
| 5,059,398 A | * | 10/1991 | Kenney | ....................... 222/249 |
| 5,858,195 A | * | 1/1999 | Ramsey | ....................... 204/450 |
| 5,863,801 A | * | 1/1999 | Southgate et al. | ........... 422/101 |
| 5,872,010 A | * | 2/1999 | Karger et al. | ................ 204/451 |
| 5,968,331 A | * | 10/1999 | Kambara et al. | ............ 204/450 |
| 6,033,544 A | * | 3/2000 | Demers et al. | ............. 204/450 |
| 6,048,498 A | * | 4/2000 | Kennedy | ..................... 204/451 |
| 6,086,740 A | * | 7/2000 | Kennedy | ..................... 204/601 |
| 6,140,045 A | * | 10/2000 | Wohlstadter et al. | ........ 204/400 |
| 6,149,787 A | * | 11/2000 | Chow et al. | ................. 204/451 |
| 6,235,175 B1 | * | 5/2001 | Dubrow et al. | .............. 204/450 |
| 6,251,343 B1 | * | 6/2001 | Dubrow et al. | .............. 422/100 |
| 6,274,089 B1 | * | 8/2001 | Chow et al. | ................. 204/601 |
| 6,331,439 B1 | * | 12/2001 | Cherukuri et al. | ........... 436/174 |
| 6,413,782 B1 | * | 7/2002 | Parce et al. | .................. 204/451 |
| 2001/0027919 A1 | * | 10/2001 | Kazumichi et al. | .......... 204/453 |
| 2002/0015667 A1 | * | 2/2002 | Chow | ......................... 422/100 |
| 2002/0025582 A1 | * | 2/2002 | Hubbard et al. | ............. 436/180 |
| 2002/0081741 A1 | * | 6/2002 | Braun et al. | .................. 436/43 |

FOREIGN PATENT DOCUMENTS

| | | |
|---|---|---|
| WO | 95/26796 | 10/1995 |
| WO | 96/14934 | 5/1996 |
| WO | 98/05424 | 2/1998 |
| WO | 98/05958 | 2/1998 |
| WO | 98/16315 | 4/1998 |
| WO | WO 99/10735 | 3/1999 |

* cited by examiner

Primary Examiner—Jill Warden
Assistant Examiner—Brian R. Gordon (57) ABSTRACT

A supply element for a microfluid microchip that can be used for chemical analysis has supply lines or reservoirs that serve to supply the microchip with substances or reagents. Both ends of the supply lines are sealed to prevent the substances from leaving the supply element or contaminating the contained substances before an experiment. In addition, supply lines are provided that are designed as contact pins to transfer electrical voltage from the supply device to the microchip and serve to offer the required electrical potential for moving the substances corresponding to the microfluid structure of the microchip. The supply element permits the microchip to be easily supplied according to the cited requirements with the required substances for a respective experiment and, in particular, has the advantage that only the supply element itself directly contacts the microchip and can be soiled or worn. The supply element can also be advantageously exchanged with a new element between individual experiments to advantageously reduce to a minimum the danger of contamination by substances on the microchip.

20 Claims, 9 Drawing Sheets

SUPPLY ELEMENT FOR A LABORATORY MICROCHIP

BACKGROUND OF THE INVENTION

In general, the present invention concerns microchip laboratory systems that carry out chemical and chemical-physical, physical, biochemical and/or biological processes, especially for analyzing or synthesizing substances on a substrate with a microfluid structure by controlling the movement of the substances on the substrate electronically, mechanically or in another manner. In particular, the invention concerns a supply element for such a microchip that has a first supplier to supply the substances and a second supplier to transmit the potential necessary for moving the substances corresponding to the microfluid structure.

The continuous development in this area is best illustrated by a comparison with corresponding developments in the field of microelectronics. In the field of chemical analysis as well (for example, in the areas of chromatography or electrophoresis), there is a substantial need to integrate existing stationary laboratory devices into portable systems and correspondingly miniaturize them for laboratory and clinical diagnostics. An overview of the most recent developments in this field of microchip technology is found in a collection of relevant professional publications edited by A. van den Berg and P. Bergveld and published by Kluwer Academic Publishers (Holland, 1995) with the title, *Micro Total Analysis Systems*. The starting point for these developments was the established method of capillary electrophoresis. Efforts had been made in the past to implement this method on a planar glass microstructure.

Figure 1:
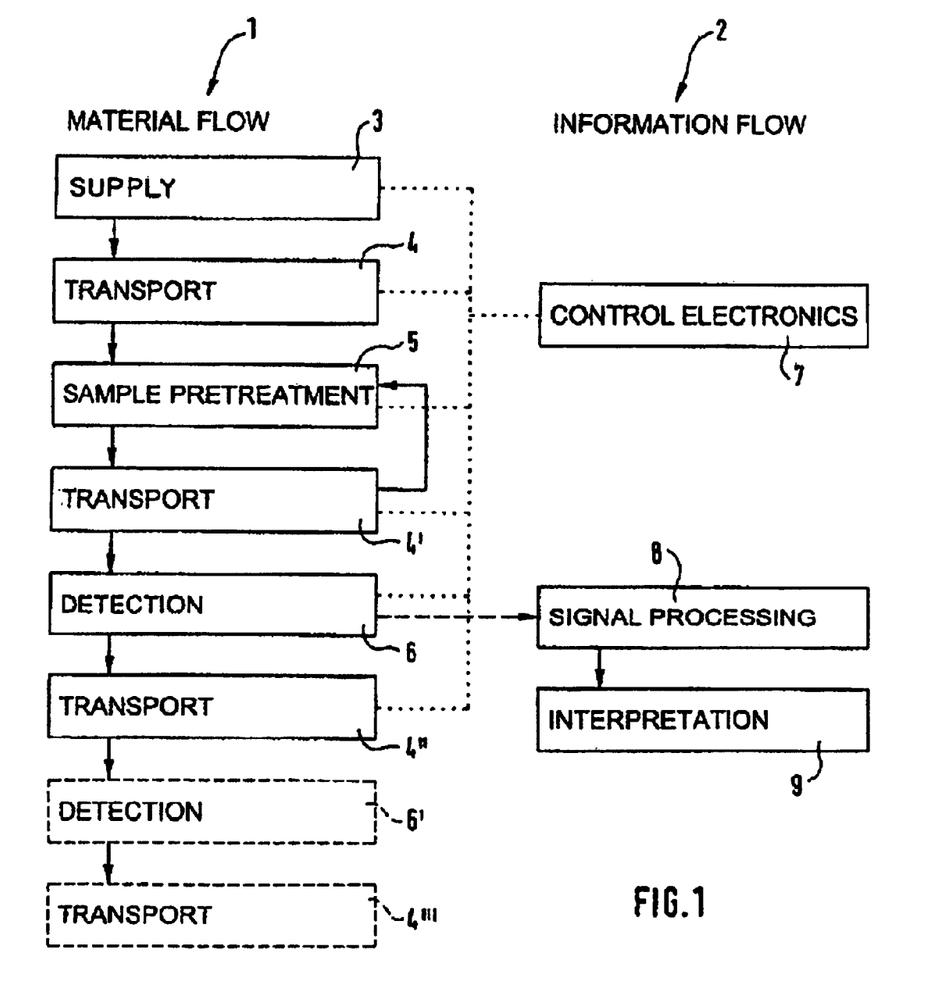
FIG. 1 is a schematic block diagram of the functional components required for a laboratory microchip system under discussion.

The basic required components for such a microchip system are shown in FIG. 1. They are basically divided into systems that have a material flow 1, and systems that represent an information flow 2 that occurs during an experiment. In the area of the material flow 1, means are necessary to supply 3 and transport 4 substances on the chip, and means are required to treat or pretreat 5 the investigated substances. Furthermore, sensors are required for detection 6 of the results of an experiment. The arising flow of information is essentially for controlling the transport of substance on the chip using, e.g., control electronics 7. In addition, a flow of information occurs while processing the signals in the signal processing step 8 of the detected measured results, and especially while evaluating or interpreting them 9. Additional needed transport steps 4', 4", and 4'" are also shown.

Figure 2:
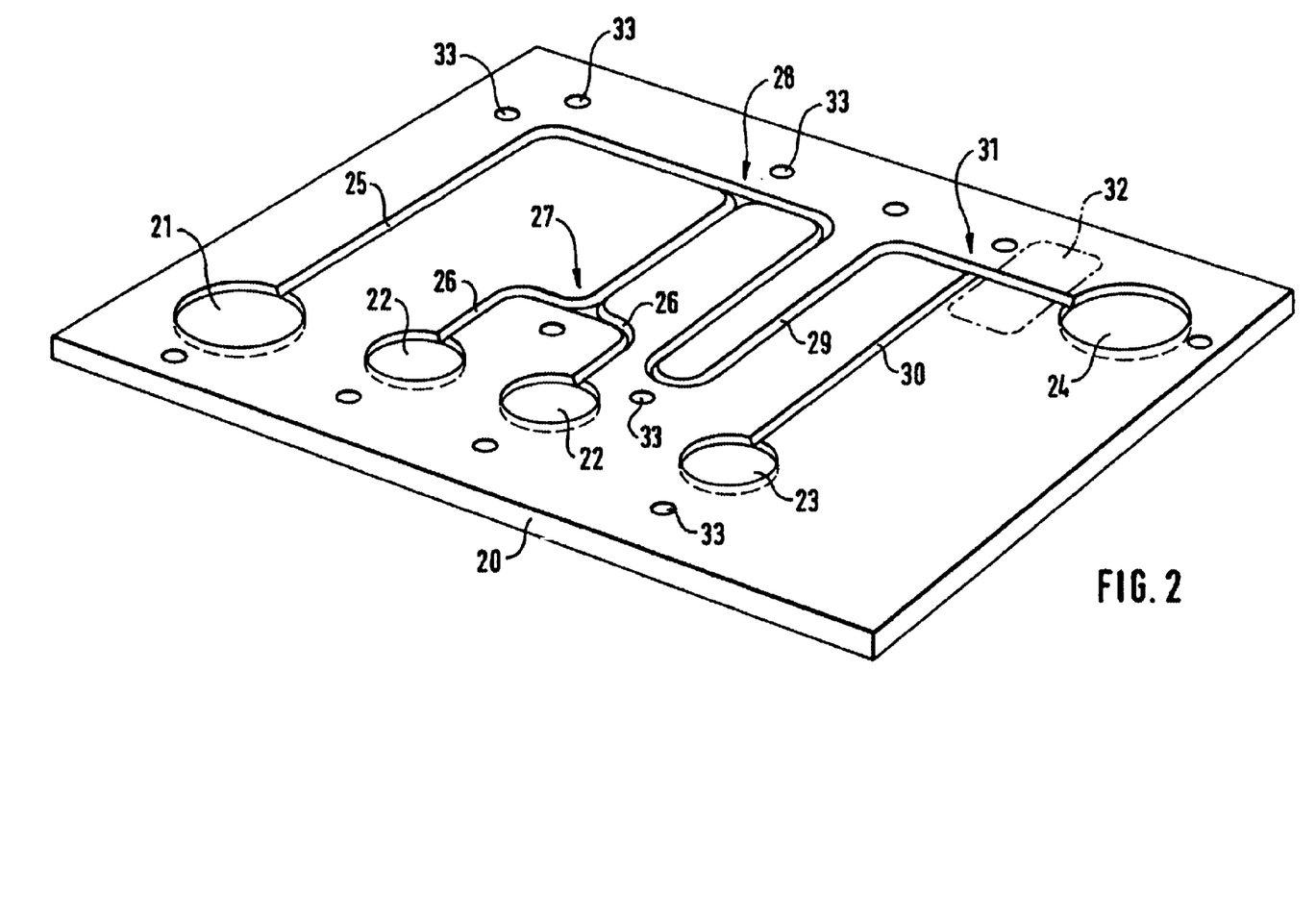
FIG. 2 is a view of a laboratory microchip for use with a supply element according to the invention.

Another motivation for corresponding miniaturization in the field of chemical analysis is to minimize the transport paths of the substances, especially between the substance supply and the respective detection point of a possibly occurring chemical reaction (see FIG. 2). It is known from the fields of liquid chromatography and electrophoresis that substances can be separated more quickly in such systems (test results are therefore available more quickly), and that individual components can be separated with a higher resolution than is possible with conventional systems. In addition, the amount of substances (especially reagents) that micro-miniaturized laboratory systems use is greatly reduced, and the substance components are mixed much more efficiently.

The above-mentioned background is discussed in detail in an article by Andreas Manz et al. on page 5 ff. of the above-cited collection. The article also states that the authors have already manufactured a microchip consisting of a layer system of individual substrates that permits a three-dimensional transport of substances.

In contrast to creating a micro-laboratory system on a glass substrate, systems are mentioned in the above-cited article that use a silicon-based microstructure. On this basis, apparently already-integrated enzyme reactors (e.g., for a glucose test), micro-reactors for immunoassays, and miniaturized reaction vessels for DNA quick assays using the method of polymerase chain reaction have been created.

A microchip laboratory system of the initially-cited type is also discussed in U.S. Pat. No. 5,858,195 where the relevant substances are moved by a system of connected channels integrated in a microchip. The movement of these substances in these channels can be precisely controlled using electrical fields that are applied along the transport channels. Given the highly-accurate control of substance movement that this allows as well as the very exact dosing of the moved substances, the substances can be precisely mixed or separated, and/or a chemical or physical-chemical reaction can be induced with the desired stoichiometry. In this laboratory system, the integrated channels also have numerous substance reservoirs that contain the necessary substances for chemical analysis or synthesis. These substances are also moved out of the reservoirs along the transport channels by means of electrical potential differences. The substances moved along the transport channels therefore contact different chemical or physical environments that allow the necessary chemical or chemical-physical reaction to take place between the respective substances. In particular, the prior-art substrate has one or more transport channel intersections at which these substances are mixed. By simultaneously using different electrical potentials at different substance reservoirs, the volumetric flows of the various substances through one or more intersections can be selectively controlled; a precise stoichiometric template is therefore possible based just on the applied electrical potentials.

By means of the cited micro-technology, complete chemical or biochemical experiments can be carried out using microchips tailored to the respective application. Supplying the microchip with the substances to be investigated and also the existing reagents is of decisive importance.

In handling microchips in measurement set-ups for experiments, the chip of the measuring system must be easily exchangeable, and the measuring set-up must be easily adaptable to different microchip layouts. This adaptability is related not only to the respective arrangement of the substance reservoirs but also to the high voltage necessary for moving the substances on the chip, and the corresponding application of the voltage to the microchip. For such a measuring set-up, you therefore need to run electrodes to the contact surfaces correspondingly provided on the microchip, and you need devices to supply the substances to the cited reservoirs. In particular, in the cited cases, the microchip dimensions range from a few millimeters to approximately 1 centimeter which makes the chip relatively difficult to handle.

Moving substances by high voltage is, however, only one of several variations. For example, the force or potential difference necessary to move the substances can also be created by applying a pressurized medium, preferably compressed air or another suitable gas medium, such as a rare gas. The movement of the substances can also be generated by a suitable temperature gradient where the movement is brought about by thermally expanding or compressing the respective substance.

In particular, the selection of the respective medium to provide the potential or force to move the substances on the microchip depends on the physical properties of the substances themselves. With substances that have charged particles, for example charged or ionized molecules or ions, the substances are preferably moved using electrical or electromagnetic fields of suitable strength. The paths travelled by these substances depend in particular on the field strength and how long the field is applied. In contrast, electrically uncharged substances are preferably moved using a flow medium such as compressed air. Given the very small dimensions of the transport channels in the microchip, only a relatively small volume of air is required on the level of picoliters. For substances that have a relatively large coefficient of thermal expansion, a thermal procedure may be recommendable to move them, yet only when the resulting increase in temperature does not influence the kinetics of the reaction during the experiment.

Given the potential complexity of the reactions, the number of required contact electrodes can be several hundred or even more. In addition, these substances can be moved in transport channels of any three-dimensional design, e.g., in troughs or grooves, or hollow channels that are enclosed on all sides. Hollow channels can be filled with a liquid or gelatinous buffer medium to further control or adjust the precise flow rates of these substances. The flow rates can be very precisely set by the applied electrical fields based on the movement of charged particles through such a gel.

By using a buffer gel or buffer solution, mixtures of charged molecules can be advantageously moved through the medium by an electrical field. Several electrical fields can be applied simultaneously or sequentially to separate substances or correspondingly supply the respective substances on a precise schedule, possibly with different time profiles. This procedure can be used to create complex field distribution or fields that migrate beyond the separating medium. Charged molecules that travel through gels with a greater degree of mobility than through other substances can thereby be separated from slower substances with less mobility. The precise spatial and temporal distribution of the fields can be determined by corresponding control or computer programs.

In addition, micromechanical or micro-electromechanical sensors are presently being considered for use in the cited area of microfluid technology. e.g., micromechanical valves, motors or pumps. A corresponding perspective on possible future technologies in this field is provided by a relevant article by Caliper Technologies Corporation.

When this new technology becomes accepted by the affected circle of users, the cited microchip will quickly become a mass-produced article and catch on similar to immunoassays as quick tests in the fields of laboratory diagnostics and clinical diagnostics. There is therefore a substantial need for a measuring set-up to practically handle and operate such a microchip that allows the easy and especially low-contamination or contamination-free supply of the investigated substances, possibly along with the necessary reagents for the respective experiment. There is also a need for a highly simplified method to handle the microchips to make them easy to use in the cited laboratory environment by chemistry or biology lab assistants who generally have a relatively low amount of technical skill.

This would also allow corresponding large-scale acceptance of the chip and relatively easy and quick evaluation of the measuring results. In addition to the appropriate and easy manipulation of the chip, users should have to deal as little as possible with the cited supply devices for supplying the microchips with the cited substances (and especially any required high voltage) or any other necessary technical devices.

It must be noted that the connecting elements between the supply lines of the supply devices and corresponding means of conveyance on the microchip are subject to more-or-less strong mechanical, electrical or chemical wear or corrosion, and are often strongly soiled when they are in direct contact with the substances on the microchip. Of particular significance is that the utilized substances (especially the reagents) in many of the relevant chemical experiments require an extremely high degree of purity. The slightest amount of impurities in the supply lines can substantially falsify the measurement results. In addition, a generic device should be easily and quickly convertible for measurements using microchips with different layouts.

SUMMARY OF THE INVENTION

The cited problems are solved with a supply element according to the invention for the initially described laboratory microchip in that the supply element has a first substance-containing supplier that in turn has seals which open the first supplier to the microchip when the supply element and microchip are joined, and this allows the substance to be transferred from the supply element to the microchip.

The suggested supply element according to the invention hence allows the microchip to be supplied easily according to the cited requirements with the substances needed for the respective experiment. The supply element according to a first embodiment can serve just as an intermediate storage for the substances to be investigated and/or the required reagents for the respective experiment, and e.g. can be removed from the microchip after transferring the substances from the supply element to the microchip. Afterwards, the required supply equipment for operating the microchip, e.g. an electrical power supply, can be brought into contact with the microchip.

According to an alternative embodiment of the supply element, it can have other supply lines in addition to the cited supply lines for the substances that bridge corresponding supply lines of the supply equipment to the microchip. In this embodiment, the supply element can remain connected to the microchip after the substances are transferred to the microchip and does not have to be removed prior to performing an experiment.

In particular, all the alternative embodiments of the supply element have the advantage that only the supply element directly contacts the microchip and can become soiled or worn. The supply element can also be advantageously exchanged with new elements between individual experiments to minimize the danger of (mutual) contamination by substances on the microchip.

In addition, the supply element allows any supply equipment to be easily and quickly adapted to different microchip layouts.

The suggested supply element preferably has electrodes or supply channels for supplying the microchip with electrical, mechanical or thermal energy by means of which the necessary potential can be generated for the microfluid movement of the substances on the microchip. If the substances on the microchip are moved by means of a compressed gaseous medium such as compressed air, supply channels are provided in the supply element to supply the microchip with the respective compressed medium.

In an embodiment where additional suppliers are provided to supply the microchip with at least some of the necessary substances to operate the microchip, the supply element has corresponding supply channels to supply the microchip with these substances. It must be emphasized in this context that the supply lines for the power supply and the supply channels to supply the microchip with the substances can be designed as a single unit, for example as metallic hollow tubes, through which electrical power can be supplied to the microchip in addition to the substances.

The supply element according to the invention can also be formed by a substrate especially consisting of a ceramic or polymer material in which the cited electrodes or supply channels are embedded. With these materials, the interface element can be highly resistant to the utilized chemical substances, and they can also be easily cleaned with chemicals and then reused.

In an advantageous development of the inventive idea, the supply element can be affixed to the supply equipment by a bayonet lock. Such an attachment allows the supply element to be easily and quickly exchanged, e.g., after an experiment.

In addition, a first coder can be on the supply element for identification that interacts with a corresponding second coder on the corresponding supplier. This measure makes the device according to the invention particularly safe to use since it effectively prevents a supplier incompatible with the supply element from being accidentally used or installed. To further increase operational reliability, a magnetic sensor (especially a Hall sensor) can be provided to identify the supply elements, or a shut-off device or warning device that works with the sensor can be provided.

Finally, the microchip can be in a first assembly, and the supply equipment as well as the supply element can be in a module releasably connected to a second assembly. The module is preferably designed as an insertable cassette or cartridge. The entire device can be designed to be set up as a stationary unit or a portable device for ambulatory local experiments, e.g., for a patient.

Other tasks, advantages, and features of the device according to the invention can be found in the following detailed description of the exemplary embodiments.

BRIEF DESCRIPTION OF THE DRAWINGS

Shown in particular are:

FIGS. 4a1, 4a2, 4b1, and 4b2 are section and perspective side views of a supply element according to the invention;

DETAILED DESCRIPTION

The functional components required for the laboratory microchip system under discussion and the typical functional sequence in an experiment using such a system are schematically represented in FIG. 1. In this functional sequence, a microchip (outlined in FIG. 2) is required. In this representation, a distinction is drawn between the material flow 1 that arises in such a system (i.e., the investigated substance or the used reagents) and the information flow 2 in relationship to the controlled movement of the individual substances on the microchip; and in relation to the detection of the experimental results.

The substances to be investigated (possibly along with the required reagents for the respective experiment) are first fed to a supply area of the microchip where the material is to flow. Then the substances are moved or transported 4 on the microchip (e.g., by means of electrical force in the case of ionized substances). Both the supply and the movement of the substances are effected by suitable control electronics 7 as indicated by the dashed line. In the present example, the substances are pretreated 5 before they are subjected to the actual experiment. They can be, e.g., pre-heated by a heater, or pre-cooled by a suitable cooling device to precisely reproduce the teal test conditions. Of course, the temperature of a chemical experiment normally substantially influences the experimental kinetics. As indicated by the arrow, this pretreatment can also be sequential, whereby a pretreatment step 5 and another transport step 4' are correspondingly triggered. The cited pretreatment is particularly useful for separating substances so that only specific components of the starting substance will be available for the respective experiment. Basically, both the amount of substance (quantity) as well as the rate of the substance (quality) can be determined by the described means of transport. In particular, by precisely setting the amount of substance, the individual substances or substance components can be precisely dosed. The last-cited procedures are also preferably controlled by means of the control electronics 7.

The actual experiment may occur after several pretreatments; the experimental results can be detected 6 at a suitable detection point on the microchip. The means of detection are preferably optical, e.g., a laser diode is used together with a photocell, or a conventional mass spectrometer. The resulting optical measurement signals are sent to a signal-processing device for processing signal in step 8 and then to an evaluation unit (e.g. a suitable microprocessor) for interpretation 9 of the measurement results.

After the above-cited detection 6 occurs, other test series, analyses or substance separations can occur, for example concerning various stages of a complex chemical experiment. To this end, the substances are transported further 4" after the first detection step 6 and moved to a different detection point for another detection step 6'. At this point, steps 4' and 6 are basically repeated. Finally, the substances are supplied to a drain (not shown) in a final transport step or collection step 4'" after all the reactions or experiments are over.

FIG. 2 shows a typical laboratory microchip that is suitable to be used in connection with a suggested supply element according to the invention. Let us first describe the technical design of such a microchip in detail since it substantially influences the design of the device according to the invention described below. Microfluid structures have been created in the displayed top of a substrate or carrier 20 to receive and transport the substances. The substrate 20 can, e.g., be made of glass or silicon, and the structures can be created by chemical etching or laser etching.

There are one or more recesses 21 on the substrate that serve as reservoirs for the investigated substance (termed substance sample in the following) to be applied to the microchip. In the experiment, the substance sample is first moved along a transport channel 25 in the microchip. In the present exemplary embodiment, the transport channel 25 is formed by a V-shaped trough. However, any other design is possible for the transport channels, e.g., recesses or grooves with rectangular or circular cross-sections.

The required reagents for the experiment are introduced into other recesses 22 also serving as substance reservoirs. The present example concerns two different substances. Via corresponding transport channels 26, they are first fed to an intersection 27 where they mix and (possibly after a chemical reaction) form the reagent that is finally used. This reagent contacts the substance sample to be investigated at another intersection 28 where both substances mix.

The substance formed in this manner then passes through a meandering transport channel section 29 that basically serves to artificially lengthen the path available for the reaction between the substance sample and the reagents. In another recess 23 serving as a substance reservoir, there is another reagent which in the present example is fed to the existing substance mixture at another intersection 31.

In this example, it is assumed that the actual investigated substance reaction occurs directly after the cited intersection 31, and the reaction can be detected within an area 32 (or measuring field) of the transport channel by means of a detector (not shown) preferably without contact. The corresponding detector can be above or below the area 32. After the substance passes through the cited area 32, it is fed to another recess 24 that forms a drain for the waste created during the reaction.

Finally, there are recesses 33 in the microchip that serve as contact surfaces for introducing electrodes, and that allow the required electrical voltage or high voltage to operate the microchip. Alternately, the chip can be contacted by directly introducing corresponding electrode tips into the recesses 21, 22, 23, 24 provided for receiving the substances. By suitably arranging the electrodes 33 along the transport channels 25, 26, 29, 30 and correspondingly harmonizing the sequence and/or strengths of the used fields, the individual substances can be moved according to a precisely set sequence and rate so that the kinetics of the basic reaction process can be precisely controlled or maintained.

When the substances are moved within the microfluid structure propelled by compressed gas (not shown), it is necessary to design the transport channels as enclosed pathways, e.g., as hollow channels with any desired cross section. With this embodiment, the recesses 33 must be designed so that the corresponding pressure supply lines end in them in a sealed manner so that a compressed medium (such as air) can be introduced into the transport channels.

Figure 3:
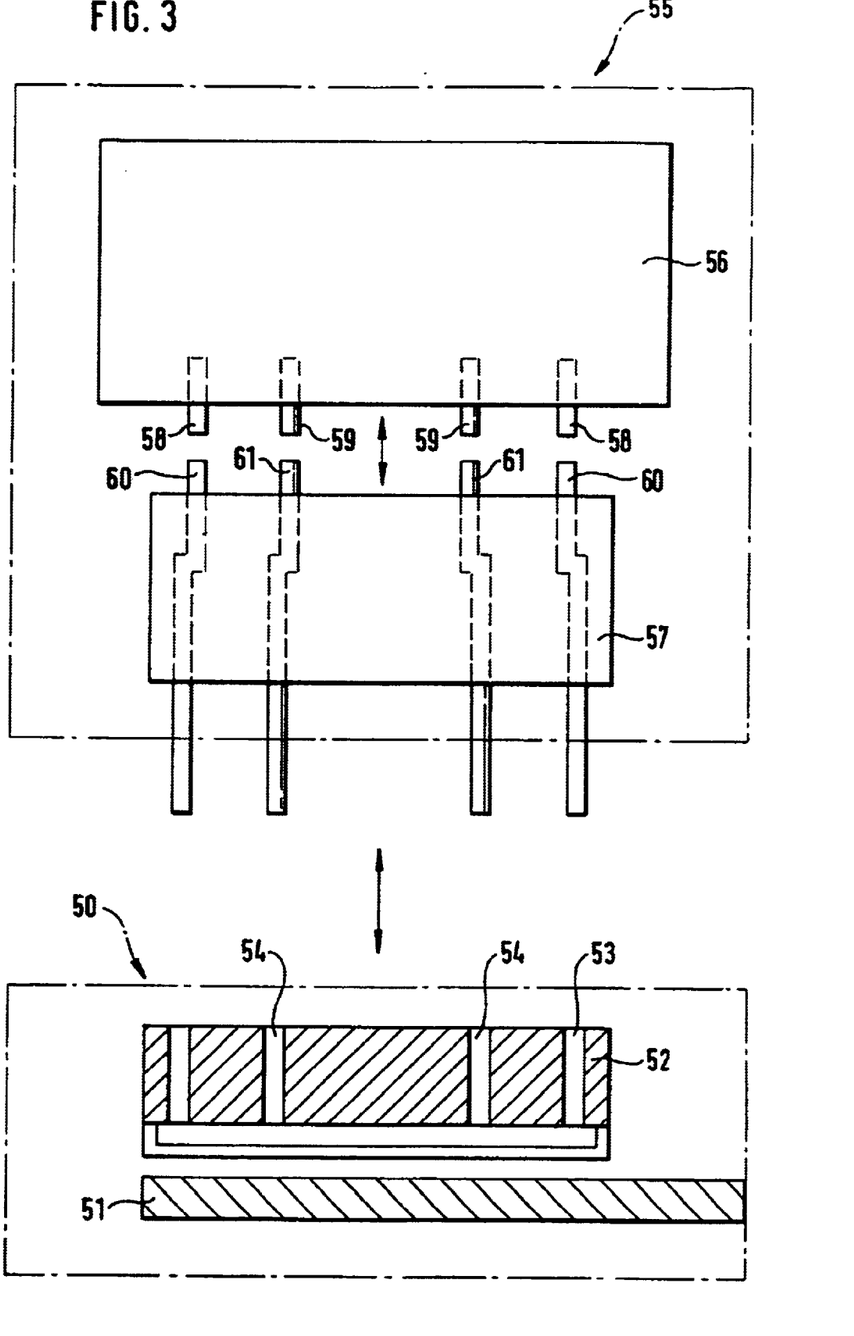
FIG. 3 is a block diagram of an exemplary embodiment of the device according to the invention to operate a laboratory microchip.

A typical design of the overall device to handle and operate the microchip having a supply element according to the invention will now be further explained with reference to FIG. 3. The individual components of the entire device are strictly modular to allow the greatest possible flexibility when operating the device. A first assembly 50 has a mounting plate 51 to receive the initially-described microchip 52. In this example, the microchip 52 contains two different types of connecting elements. On the one hand, these are recesses 53 to receive electrical contacts to provide the required electrical voltage for moving the substances on the microchip. These recesses 53 can either serve as just a mechanical seat for electrode tips, or they themselves represent electrodes, e.g., by suitably metallizing the inner surface of the recesses. In addition, the possibly metallized recesses can be connected with other electrode surfaces (not shown) on the microchip that provide the required electrical field to move the substances. Such electrode surfaces can also be manufactured using prior-art coating techniques.

Optional recesses 54 can be provided to accept substances, especially reagents. In addition, a second assembly 55 is provided that contains the required supply device 56 for operating the microchip 52. By suitably miniaturizing the required components, the supply device 56 preferably represents a microsystem that provides the required electrical voltage or compressed medium via corresponding electrodes 58 (or lines 58 for a pressure supply system) in the form of a cartridge that can be inserted in the assembly 55. If the microchip is supplied with electricity, the electrical voltage supply can be miniaturized using conventional integrated circuitry; if pressure is supplied, the miniaturization can be provided by corresponding techniques familiar in the fields of modern laboratory technology or micromechanics. The supply containers for the compressed gas can also be integrated since, as mentioned, the required gas volume is in the picoliter range.

In the shown exemplary embodiment, the supply element according to the invention has electrical linkages 60 or connecting channels that bridge the electrodes 58 or the channels of the supply device 56 and the recesses 53 of the microchip. On one hand, the bridging serves to prevent wear and soiling of the supply device 56 electrodes that arises when the microchip is contacted such that the supply element basically assumes this function as a disposable product. As shown in the present exemplary embodiment, the supply element can also serve to spatially adapt the supply device 56 electrodes to the respective surface or spatial arrangement of the microchip's electrode surfaces. The entire measuring and operating device can be advantageously adapted to a special microchip layout just by exchanging the supply device 56 and/or the supply element 57. In particular, by exchanging the entire supply device, the handling device can be quickly and easily adapted to different test series or types of operation, as for example when changing from an electrical to pressure supply of the microchip.

Two exemplary embodiments of a supply element according to the invention will now be described with reference to FIGS. 4$a$1–4$a$2 and 4$b$1–4$b$2. FIGS. 4$a$1–4$a$2 show a sectional view and FIGS. 4$b$1–4$b$2 show a corresponding perspective side view of the two embodiments. The shown supply element illustrates a typical state before the supply element is joined with a microchip (not shown).

Let it be noted that the suggested supply element (as will be further discussed in detail with reference to FIGS. 5$a$–5$d$ in relation to the two different embodiments) can also be designed to function as a transport medium for the substances to supply them to the microchip, and as a bridging medium or intermediate carrier to advantageously bridge electrodes or the like as described to supply the microchip with the required force to move the substances on the microchip. This contrasts with the above-described embodiment where the element only serves to supply the microchip with substances and is not used again after supplying them. When both purposes are fulfilled, it serves a dual function.

In the embodiment of FIGS. 4$a$1 and 4$b$1, the supply lines (hollow tubes or hollow channels) 70 which transfer substances are designed as capillaries or cavities that extend above the interface element with reference to the side surfaces of the interface element. The supply lines 70 are sealed with a chemically resistant substance, such as wax, filling compound, etc. at their ends 79 and hence can be sealed so as to be air- and gas-tight.

In the embodiment of FIGS. 4a2 and 4b2, the ends of the supply lines 79' are flush with the respective side surfaces of the interface element and are sealed to the outside with a flush membrane 69 on both sides. The supply lines 79' hidden or invisible under the membrane 69 are also indicated here by circles and semicircles drawn in dashed lines. The membrane 69, formed of a chemically resistant material, is only occasionally penetrated by the provided electrodes or contacts (contact pins) 76, 78. The contacts form an electrically-conductive connection with the corresponding counter electrodes provided for the supply device or on the microchip without the membrane 69 having to be penetrated. The membrane can also, for example, be a metal film for a gas-tight seal. Alternately, they can be made of a material permeable to gas, such as a polymer.

The substances 72 in the hollow paths 70 can be moved in two ways. On the one hand, the membrane 69 can be penetrated on both sides in the area of the supply lines 70, and the substances can be propelled just by capillary force from the interface element to the microchip without other required measures. In one variation, however, the membrane 69 is only penetrated on one side, and the sealed part of the membrane 69 is pressurized with a gas so that the substance at the open side of the membrane 69 (automatically) exits just due to the rise in pressure in the supply line 70. The pressure is supported by the entrance of gas into the cavity when a gas-permeable membrane is used.

According to FIGS. 4a1, 4a2, 4b1, and 4b2, the shown supply element for both embodiments has supply lines or reservoirs 70 that serve to supply the microchip (not shown) with the required substances or reagents 72 for the respective experiment. The supply lines 70 in the embodiment on the left side are similarly capped or sealed at both ends 79 by means of wax 71, etc. to effectively prevent the substances 72 from leaving the supply element or to prevent contamination of the substances 72 contained therein prior to the experiments. The seal can be created with known means from vacuum technology so that the substances 72 remain air-tight or preserved sealed from the environmental air. Different substances A, B and C are contained in the supply channels or lines 70 in both embodiments. The supply lines that contain substances A and B are designed as tubular sections, and the line containing substance C has an offset 73 inside of the carrier of the supply element. In particular, the offset 73 serves to spatially adapt lines of a supply system joined with one side of the supply element and corresponding supply means on the side of the microchip. Different microchip layouts can be operated with the same operating or supply device, whereby the required adaptation of the lines or contacts is carried out solely by the supply element suggested according to the invention.

Figure 4A:
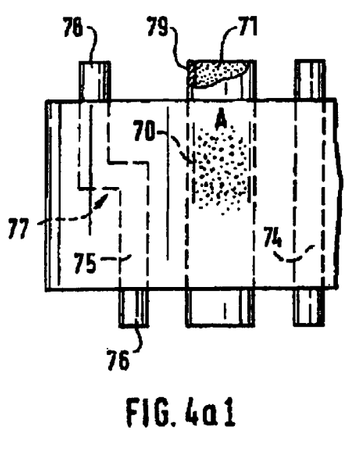
Figure 4A:
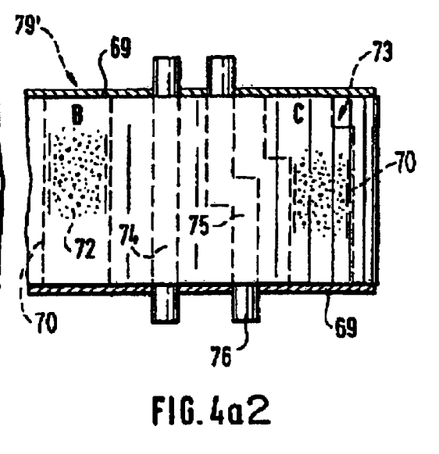
Figure 4B:
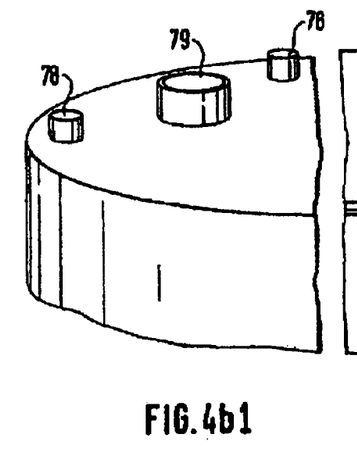
Figure 4B:
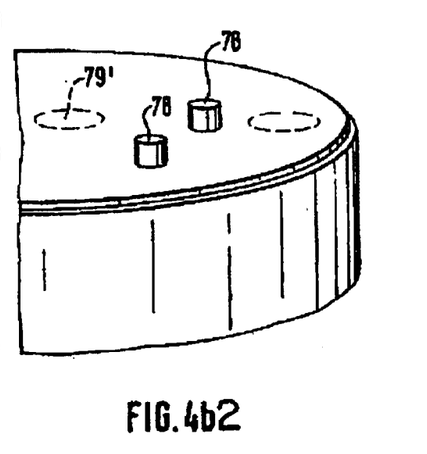

With the supply element in FIGS. 4a1–a2, supply lines 74, 75 are provided for both embodiments that are designed in the present example as contact pins to transfer electrical voltages from the supply device to the microchip and provide the required electrical potential for moving the substances corresponding to the microfluid structure of the microchip. These contact pins 74, 75 therefore have corresponding contacts 76, 78 on both ends. These supply lines 74, 75 can also have spatial adaptations (a side offset 77 in the present case) between the electrical lines of a supplies device and the corresponding contacts on the microchip through a corresponding path in the substrate. In addition, conventional seals can be provided on the ends 79 of the supply lines 70 (not shown) to effectively prevent substances from flowing out after establishing a substance-conducting connection between the supply element and the supply device or the microchip. In the second embodiment of FIGS. 4a1 and 4b2, the hollow paths (channels) 70 are efficiently sealed to the outside by pressing on the membrane 69.

FIGS. 4b1–b2 show a corresponding perspective view of the supply element shown in FIGS. 4a1–4a2, whereby corresponding functional parts are given identical reference numbers. A further description of this partial figure would therefore be superfluous.

A typical procedure for handling or operating a microchip using a supply element according to the invention that has the cited double function will be shown in the following with reference to the schematic sequence of illustrations in FIGS. 5a–5d. In this series of pictures, corresponding components are designated with the same reference numbers.

Figure 5A:
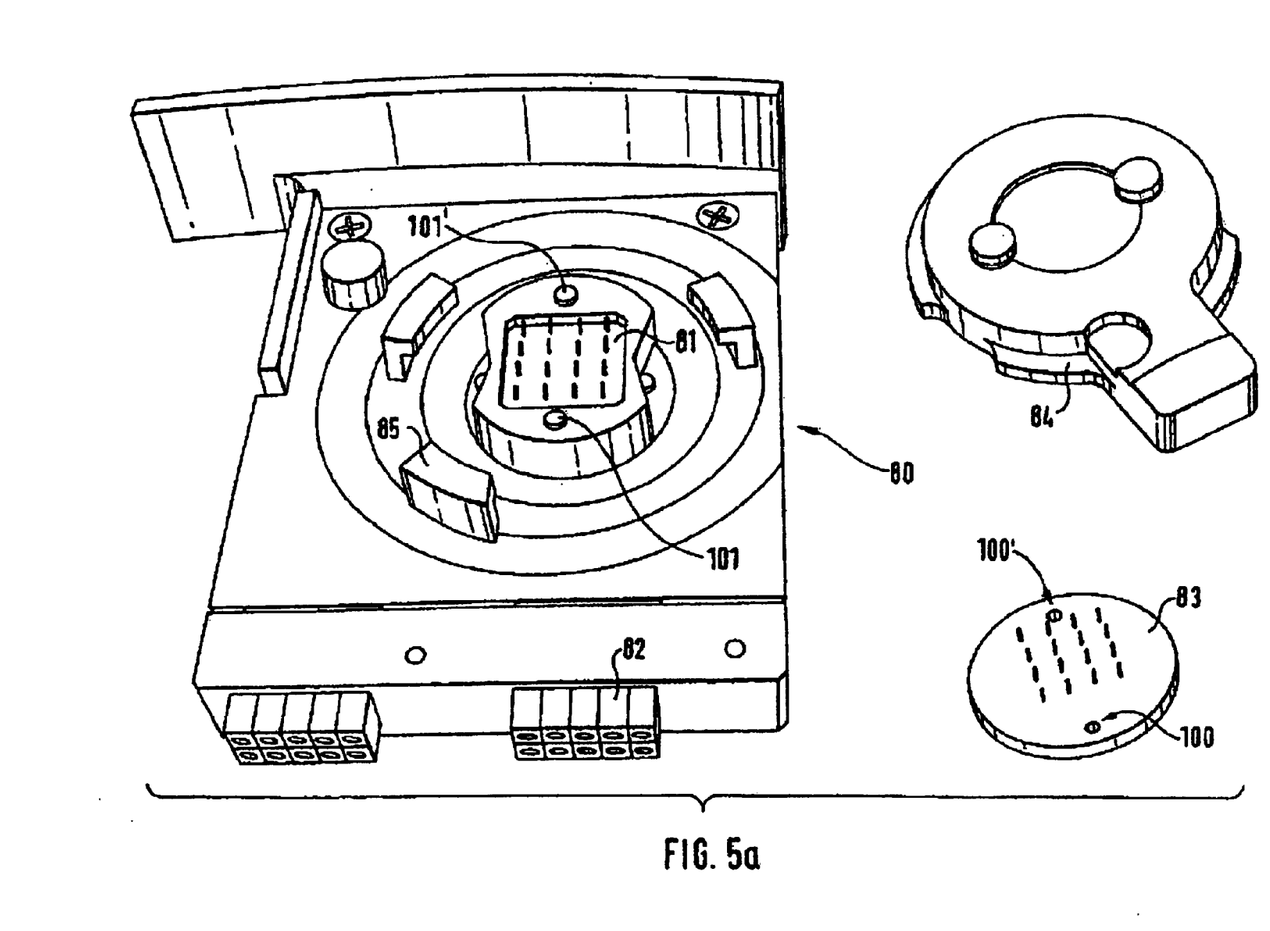
FIGS. 5a–d are a sequence of illustrations of the operating steps of another embodiment of the invention, especially with an exchangeable cartridge to receive a supply element according to the invention.

FIG. 5a shows a cartridge 80 in which is integrated a supply system (not shown) for a microchip. The supply lines of the supply system lead to the outside via a corresponding contact electrode field. In the present exemplary embodiment, this electrode field is designed as an exchangeable contact plate 81 made, e.g., of a ceramic. The cartridge is connected to the internal basic supply system (not shown) of the entire handling device via plug connections 82 that mate conventionally with corresponding counter pieces in the second assembly, and activate the corresponding contact connections when the cartridge is inserted into the assembly.

The contact electrodes of the supply system make contact with the corresponding contacts on the microchip via the supply element 83 according to the invention in the present example in such a way that the contact electrodes are bridged without changing their spatial arrangement in relationship to the microchip. The basic advantages of the supply element 83 have already been described. The supply element is releasably connected to the cartridge via a bayonet lock 84, 85. A corresponding bayonet thread 85 is therefore provided on the cartridge 80 to receive a bayonet 84. The bayonet lock 84, 85 allows the supply element 83 to be quickly and easily exchanged as a replacement or disposable part, e.g., after each experiment.

In addition, first coders 100, 100' are provided in the present exemplary embodiment that operate according to the pin/hole principle to identify the supply element, and they work together with a corresponding second coders 101, 101' on the supply equipment. The coders 100, 100', 101, 101' ensure that only a supply element compatible with the corresponding supplier can be used or, respectively, inserted in the cartridge 80. In particular, to further increase operational reliability, a magnetic sensor (not shown), especially a Hall sensor, can be provided to identify the supply element, and a shut-off device or warning device that works with the sensor can also be provided. Let it be stated that in addition to the shown embodiment that uses a pin and hole, other coders can be used such as electrical/magnet coding or the recognition of corresponding ID chip cards, or an optical coding, e.g. a color code, bar code, etc.

Let it also be noted that the supply element according to the invention can also be modular and correspondingly multifunctional. This functionality can, for example, be realized by a multilayer arrangement of channels including supply lines that correspondingly lead outward. It is, for example, possible to switch between experiments that use the same microchip by simply rotating the supply element on its axis (e.g., By 90°). Different channels or channel systems can be activated in the microchip depending on respective rotational angle. In particular, the existing rotational angle can correspondingly connect different supply lines of the supply element to different channels.

The supply element can be advantageously very thin or flat, e.g. In the form of a credit card, to make it easier to use. In addition, suitable seals can be provided in the lines or channels of the supply element to externally insulate the possibly high voltage required for operating the microchip to avoid accidents or, when a flow of substance or gas is used, suitable seals can be provided to prevent the substances from escaping after connection of the supply element to the supply device and microchip.

Figure 5B:
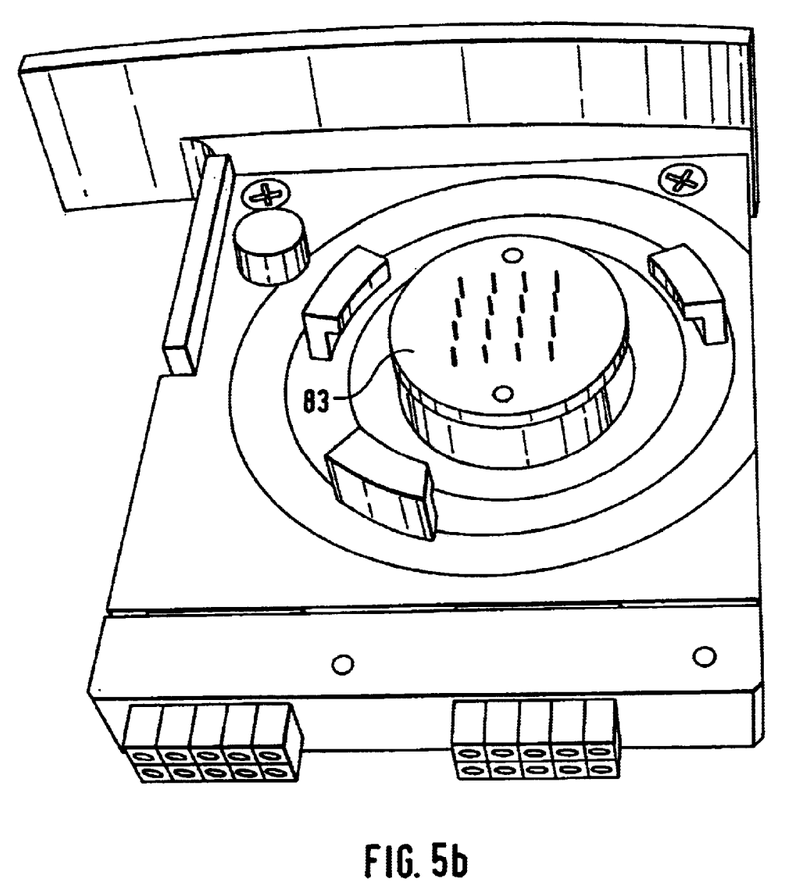
Figure 5C:
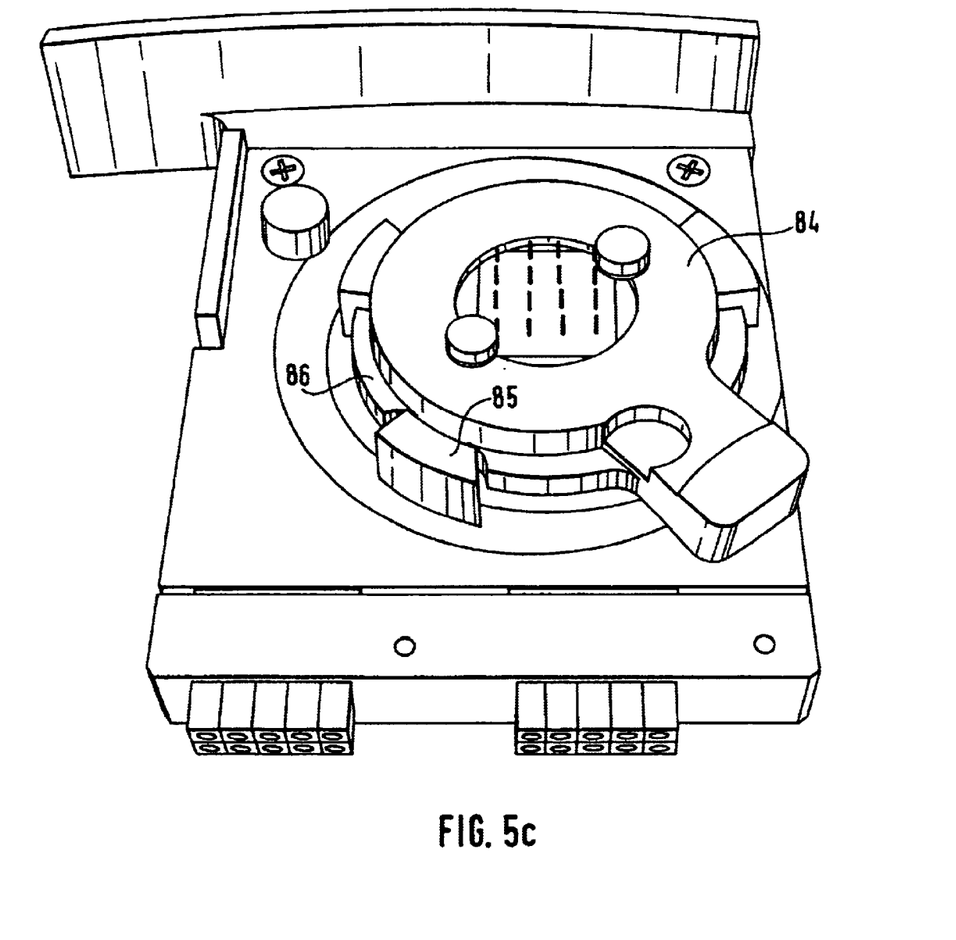

FIGS. 5b and 5c show individual installation steps for installing the supply element 83 in the cartridge 80. Corresponding to FIG. 5b, the supply element 83 is first inserted into the cartridge 80 in the installation position and then, as shown in FIG. 5c, affixed to the cartridge 80 by means of the bayonet lock 84, 85. A ring section 86 of the bayonet 84 mates with the corresponding threaded bayonet part 85. Another advantage of the cartridge (module) suggested according to the invention is shown in FIGS. 5b and 5c: the supply element 83 can be easily installed in the cartridge 80 after the cartridge 80 is removed from the second assembly.

Figure 5D:
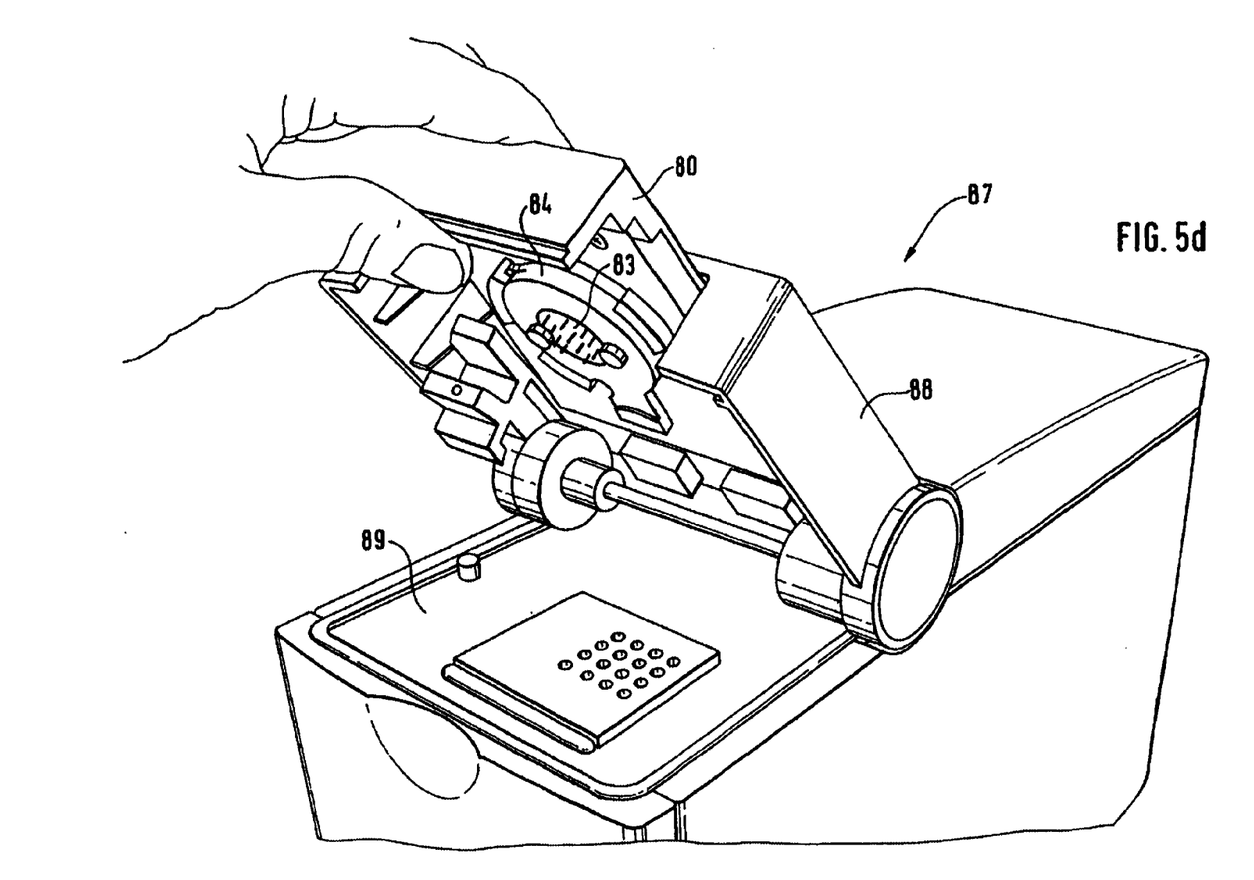

Finally, FIG. 5d shows how a correspondingly preassembled cartridge can be installed in a device housing 87 containing all the cited assemblies. In the shown exemplary embodiment, the cartridge 80 is inserted into a slot in the second assembly 88. However, other means of fixation are conceivable, e.g., a snap lock or a magnetic lock. When the second assembly 88 is closed, it contacts the first assembly 89 which serves to receive the microchip, and automatically creates the necessary contacts connections for operating the microchip.

Figure 6A:
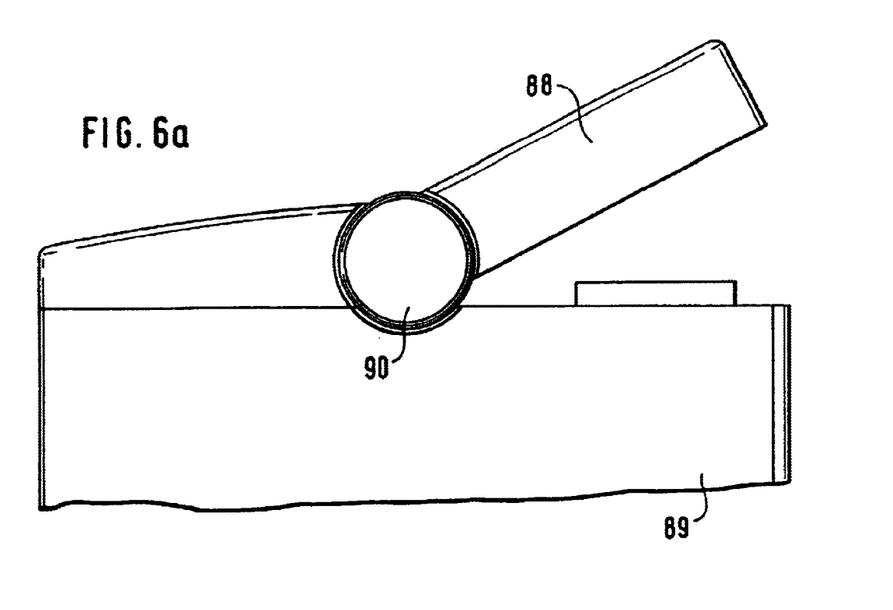
FIGS. 6a and 6b are views of an exemplary embodiment of a device according to the invention in which two assemblies are connected to each other by means of an articulation.
Figure 6B:
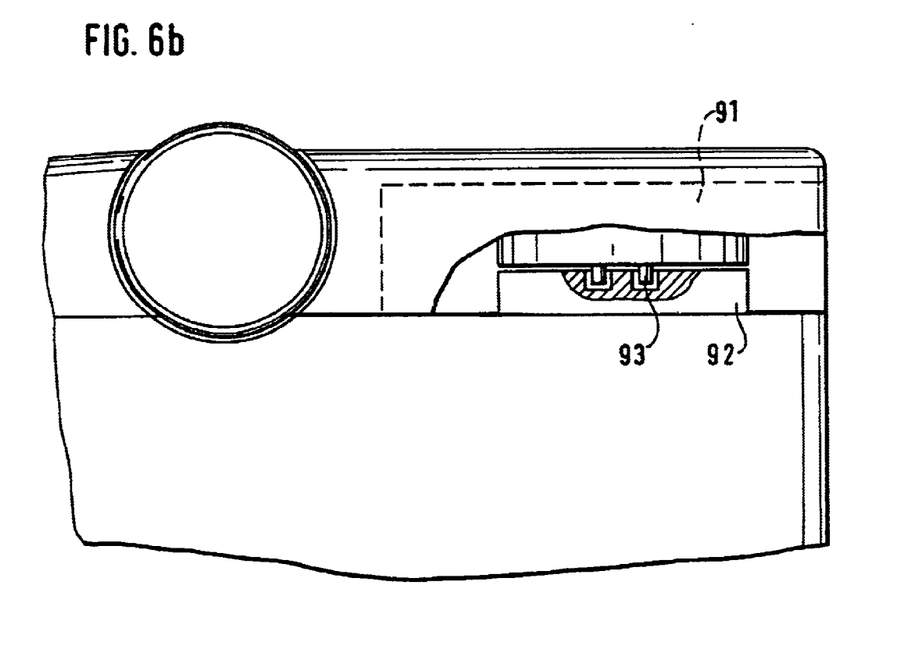

Finally, FIGS. 6a and 6b schematically illustrate an embodiment of the device housing 87 corresponding to FIG. 5d where the two components 88, 89 according to the invention are connected via an articulation 90. The advantageous spatial arrangement of the articulation is such that the contact pins 93 on the supply element 91 do not become skewed when they are inserted in the assigned recesses in the microchip which, in a worse-case scenario, could destroy the contact pins 93 or even the microchip 92.

In conclusion, the objects of the present invention are achieved by providing a supply element for a laboratory microchip (elements 20 or 52, for example) with a microfluid structure for at least one of chemical, physical, or biological processing, the microchip having a first supplier (element 54, for example) to supply substances to the microchip and a second supplier (element 53, for example) to supply a potential to the microchip to move substances corresponding to the microfluid structure, the supply element comprising: at least one substance-containing third supplier (elements 61 or 70, for example) to contain a substance, said at least one third supplier having a seal (elements 69 or 71, for example) arranged to be opened to the microchip in response to the supply element and the microchip being joined together to enable said substance to be transferred from said at least one third supplier to the first supplier of the microchip.

The supply element noted above may also include a fourth supplier (elements 74 or 75, for example) to transfer the potential to the microchip, said fourth supplier arranged to be coupled to the corresponding second supplier on the microchip.

What is claimed is:

1. A combination of a supply element and a laboratory microchip with a microfluidic structure, the microchip comprising a substance supplier; the supply element comprising at least one substance-containing supplier including a substance; wherein the microchip substance supplier is adapted to be connected in flow relation with the substance-containing supplier of the supply element; said at least one substance-containing supplier having a substance seal for maintaining the substance therein in the substance-containing supplier; the substance-containing supplier and seal thereof having a size, position, material and shape for causing the seal thereof to be opened to the microchip in response to the supply element and the microchip being joined together and for enabling said substance to be transferred from said at least one substance-containing supplier to said substance supplier disposed within the microchip, the substance-containing supplier in the supply element being different from the substance supplier in the microchip.

2. The combination of claim 1 wherein said seal of substance supplier of the supply element comprises a chemically resistant substance.

3. The combination of claim 1 wherein said seal of said supplier of the supply element comprises a wax.

4. The combination of claim 1 wherein said supplier of the supply element comprises at least one end sealed by a membrane that is flush with a side surface of the supply element.

5. The combination of claim 4 wherein said membrane comprises a chemically resistant material.

6. The combination of claim 4 wherein said membrane comprises one of a metal or gas permeable polymer.

7. A method of operating a supply element for a laboratory microchip with a substance source, a microfluid structure connected to the microchip substance source, the method being practiced with a supply element including a sealed substance source, the method comprising:
opening a seal in said substance source of the supply element in response to the supply element and the microchip being joined together;
while the seal is open transferring the substance from said substance source of the supply element to the supplier disposed in the microchip; and
moving the substance from the supplier disposed in the microchip to the microfluid structure by applying a potential to the microchip.

8. The method of claim 7, wherein opening said seal of said supplier of the supply element comprises opening a seal comprising a chemically resistant substance.

9. The method of claim 7, wherein opening said seal of said supplier of the supply element comprises opening a seal comprising a wax.

10. The method of claim 7, further in combination with sealing at least one end of the supplier of the supply element with a membrane that is flush with a side surface of the supply element.

11. The method of claim 7, wherein sealing at least one end of the supplier of the supply element with a membrane comprises sealing with a membrane comprising a chemically resistant material.

12. The method of claim 10, wherein scaling at least one end of the supplier of the supply element with a membrane comprises scaling with a membrane comprising one of a metal or a gas-permeable polymer.

13. The method of claim 7, further in combination with scaling an analyte as the substance in the supplier of the supply element.

14. The method of claim 7, further in combination with sealing a reagent as the substance in the supplier of the supply element.

15. The method of claim 7, wherein the supply element includes a plurality of the sealed substance sources, one of the plurality of sealed sources being a reagent source, another of the plurality of the sealed sources being an analyte source, the method further comprising supplying the reagent and analyte to the microfluidic structure by breaking the seals of the reagent and analyte sources.

16. The method of claim 7, further comprising coupling a potential supplier disposed within the supply element to a corresponding potential supplier of the microchip and transferring a potential from the potential supplier of the supply element to the potential supplier of the microchip.

17. The method of claim 7, further comprising releasably attaching the supply element to a holder for the supply element.

18. The method of claim 7, further comprising identifying the supply element to a second corresponding coding arrangement of supply equipment with a first coding arrangement.

19. The method of claim 7, further comprising connecting a module carrying said supply element with a first assembly and releasably connecting said module to a second assembly.

20. The method of claim 7, wherein the seal is opened by piercing said seal of said supply element and then transferring said substance to be transferred from said substance source of the supply element to the substance supplier of the microchip.

* * * * *